United States Patent [19]
Wiggins

[11] Patent Number: 5,732,659
[45] Date of Patent: Mar. 31, 1998

[54] PET TETHER ANCHOR

[76] Inventor: James S. Wiggins, 206 Montclaire Dr., West Columbia, Tex. 77486-9627

[21] Appl. No.: 729,913

[22] Filed: Oct. 15, 1996

Related U.S. Application Data

[60] Provisional application No. 60/005,293 Oct. 16, 1995.

[51] Int. Cl.⁶ .................................................. A01K 1/04
[52] U.S. Cl. .................................... 119/787; 119/711
[58] Field of Search ............................ 119/787, 779, 119/780, 786, 788, 789, 791

[56] References Cited

U.S. PATENT DOCUMENTS

| | | |
|---|---|---|
| 2,080,653 | 5/1937 | Craft . |
| 2,551,540 | 5/1951 | Johnson . |
| 3,100,476 | 8/1963 | Peak . |
| 3,123,052 | 3/1964 | Marshall ................................ 119/789 |
| 3,318,288 | 5/1967 | Mullritter ............................. 119/796 |
| 3,508,525 | 4/1970 | Sawyer . |
| 4,491,091 | 1/1985 | Satterfield .............................. 119/780 |
| 4,546,730 | 10/1985 | Holland ................................ 119/780 |
| 4,620,506 | 11/1986 | Stubbs ................................. 119/780 |
| 4,796,566 | 1/1989 | Daniels ................................ 119/789 |
| 5,022,351 | 6/1991 | Daniels ................................ 119/789 |
| 5,031,577 | 7/1991 | Flugger ................................ 119/780 |
| 5,161,487 | 11/1992 | Miller ................................. 119/786 |
| 5,353,474 | 10/1994 | Fain ................................... 119/780 |

*Primary Examiner*—Gene Mancene
*Assistant Examiner*—Yvonne Abbott
*Attorney, Agent, or Firm*—Richard C. Litman

[57] ABSTRACT

A pet tether anchor apparatus enables the leashing of one or more domesticated animals to permit: height adjustability of the leash from ground level at the stake; adjustability of rotation or non-rotation of the leash around the stake; addition of a stringer to attach to a plurality of pet tether anchors and accommodating multiple leash attachments to the stringer; and providing a protective housing or cap for the attachment assembly when it is located near the top of the stake.

9 Claims, 2 Drawing Sheets

PET TETHER ANCHOR

CROSS REFERENCE TO RELATED APPLICATION

This application is based on Provisional Patent Application Ser. No. 60/005,293, filed Oct. 16, 1995.

BACKGROUND OF THE INVENTION

1. Field of the Invention

The invention is directed to anchors in general and, more specifically, to a pet tether anchor having universal application.

2. Description of the Prior Art

The pet tether anchor apparatus is a portable apparatus designed to secure one or more animals to a specific location. The pet tether anchor can be used with most any domesticated animal over a broad range of size and weight, such as a horse, sheep, cow, dog, cat or pig or the like. The size of the pet tether anchor apparatus can vary proportionately with the size and strength of the tethered animals. The pet tether anchor can also be used with any type of leash such as a rope, chain, rod or a retractable leash device. The apparatus is equipped with a unique and versatile means of securing the leash to the portable stake, so that a link of a chain or a loop on a leash can be quickly secured to the stake. The securing means can rotate about the stake due to a sleeve at selected heights to prevent the animal from tangling the leash around the stake. The securing means can be raised off the ground near the top of the stake above the sleeve to rotate or can be positioned near ground level below the sleeve to either rotate or not. The pet tether anchor provides a unique optional cap which surrounds the top of the stake when the securing means is located at the top of the stake to protect the animal from injury when contacting the apparatus. Multiple pet tether anchors can be employed, which anchors can be connected by their U-bolts with a stringer, e.g., chain, from which multiple leashes can be connected.

Methods for confining animals to a certain locality have been in existence since animals were first domesticated. Apparatus and means of tethering animals are thus generally known in the prior art. The prior art will be discussed in the order of their perceived relevance. None of the prior art discloses a versatile pet anchor having various modes of attachment and a protective cover of the tethering device in one mode to prevent injury to a leashed animal as in the present invention.

U.S. Pat. No. 2,551,540 issued to Eric A. Johnson on May 1, 1951, describes a tethering swivel post driven into the ground with a flat circular rotatable plate mounted on bearings, from which plate a leash may be attached to one or more small holes therein. The rotatable member is attached to the stake by means of a threaded bolt and spaced from a circular plate by a short sleeve, which plate is positioned at ground level. There is no suggestion for the convenience of elevating the tethering position.

U.S. Pat. No. 3,100,476 issued to Betsey A. Peak on Aug. 13, 1963, describes an animal tie-out stake which will allow an animal to move around the stake without the leash becoming tangled on the stake. The leash is attached to an S-hook hooked around a sleeve which rotates around the stake to maintain a height close to ground level. Again, the tether is maintained close to ground level even though there is limited vertical play.

U.S. Pat. No. 3,508,525 issued to Frank L. Sawyer on Apr. 28, 1970, describes a tethering device with an enlarged collar which rotates about a stake and to which a leash may attached to an eye-bolt at a fixed height close to ground level.

U.S. Pat. No. 4,491,091 issued to Audie L. Satterfield on Jan. 1, 1985, describes an animal tethering device which is secured to a rotating post centered on a rectangular plate staked at its corners in a permanent location. The rotating post is positioned on a standard and covered with a circular post cover which has an attachment hook welded near its edge. The leash is secured at a single height on the top of the post.

U.S. Pat. No. 4,546,730 issued to John D. Holland on Oct. 15, 1985, describes a tangle-free pet hitch and feeding station. The invention provides a stake with a feeding tray about the stake, a pole with looped ends extending orthogonally from and rotatable about the stake to which a leash may be attached, and a canopy under which the animal may seek shelter from the sun. There is no teaching of attaching the leashing pole to a rotatable sleeve around the stake.

U.S. Pat. No. 4,620,506 issued to Harold L. Stubbs on Nov. 4, 1986, describes a rotatable animal tethering device having a flat square base plate with a plurality of legs which are permanently driven into the ground along with a longer stake. The animal's leash is attached to a small hole in a flange on a sleeve which rotates about the stake. There is no height adjustment available in this tethering device.

U.S. Pat. No. 5,031,577 issued to Ray T. Flugger on Jul. 16, 1991, describes a tangle-free tether post assembly to which an animal is attached by a leash to a holed disc which is held at a fixed height above a permanent position by a rotatable sleeve positioned on a stake in the ground. There is no suggestion for changing the height of the tethering disc.

U.S. Pat. No. 5,161,487 issued to Michael H. Miller on Nov. 10, 1992, describes a portable animal tether device. This device consists of a stake which is driven into the ground. A two-link chain is attached to the stake between a top flat disk and a stop nut. The animal is secured by a flattened tether which is looped around the stake and through the free chain link. No provision is made for changing the top location of the tether on the stake.

U.S. Pat. No. 2,080,653 issued to Lewis W. Craft on May 18, 1937, describes a golf practice device wherein a sleeve on a stake is fixed to an anchoring element consisting of four radiating walls. The golf ball is tethered to the top and bottom flanges of the sleeve by separate cords. The golf ball winds up on the fixed sleeve upon being hit by a golfer. No suggestion is made for modifying this device to an animal tethering apparatus.

None of the above inventions and patents, taken either singly or in combination, is seen to describe an improved means to readily attach any rope, chain or leash to a stake at any predetermined height so that the leash rope, chain or the like can freely rotate about the stake. Also, no combination of the pet anchor with an optional housing is seen to protect the secured animal from injuring itself on the stake. No prior art suggests in addition to the various modes of attachment, the option of securely fixing the leash attachment at ground level. The prior art is silent as to the connection of multiple pet anchors by a stringer from which multiple leashes can be accommodated.

SUMMARY OF THE INVENTION

The present invention provides for versatility of a pet anchor apparatus in terms of use for tethering one or more animals, raising or lowering the height of the tether from the ground, providing for rotation or non-rotation of the leash around the pet anchor apparatus, and protecting the animals from injurious contact with the pet anchor apparatus in an optional mode by providing a housing.

In more detail, a ground stake is provided with a rotatable sleeve having a U-bolt and a block assembly which is fixed on the sleeve at any length of the sleeve. The U-bolt can be readily detached from the block to add a link of a chain tether or a loop of a flexible or rigid tether. If the tether can be tied or clipped onto the U-bolt, of course, no removal of the U-bolt is necessary.

The block assembly can be placed on top of the sleeve and still rotate. An optional housing can be attached to the block assembly as a protective feature in this mode against animal injury and to maintain the block assembly on the stake. The block assembly is also available when the block assembly is directly attached to the uppermost portion of the sleeve.

The block assembly can be placed between the sleeve and the ground if desired, and rotation of the block can be either permitted or stopped depending on the clearance between the sleeve and the ground.

A retractable animal leash device can be readily attached to the block assembly with the aid of the U-bolt.

If a large plurality of animals are to be leashed along a line, for example for a dog show, multiple pet anchors can be utilized with a stringer chain or the like passing through all the U-bolts. The animals can then be tethered to the stringer.

The size of the pet anchors can be adjusted to the animal size.

DETAILED DESCRIPTION OF THE PREFERRED EMBODIMENTS

Figure 1:
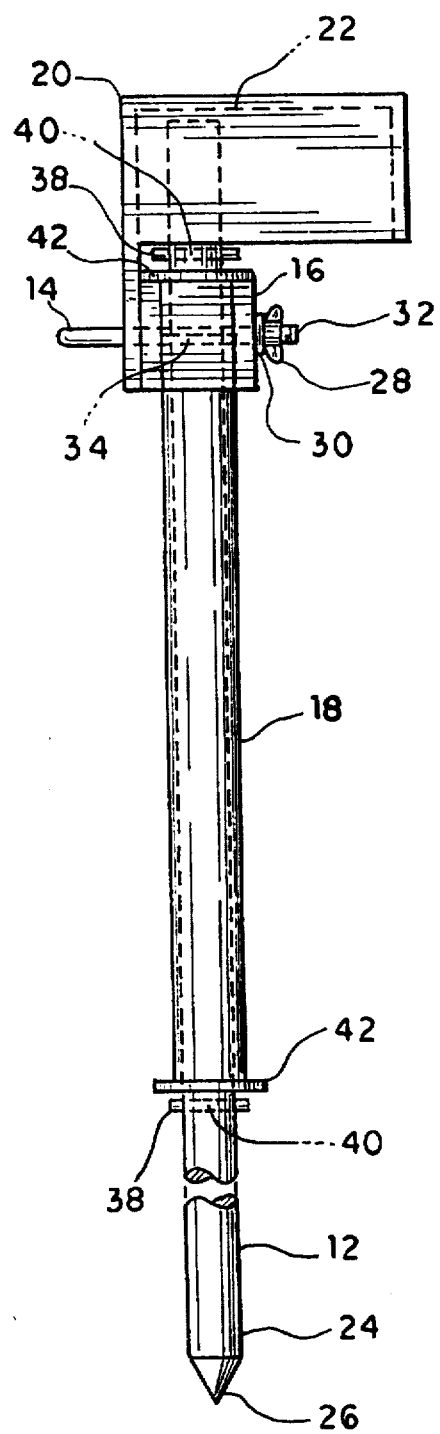
FIG. 1 is a side view of the pet tether anchor.

The present invention relates to an apparatus for tethering one or more animals. The pet tether anchor apparatus 10, as shown in FIGS. 1-5, is designed to accommodate any type of animal, but in particular those animals which are considered pets such as dogs, cats, horses, ponies, pigs, cows, and the like. In FIGS. 1, 2, 4, and 5, the apparatus 10 comprises a portable stake or shaft 12 on which a U-bolt 14 spaced from and combined with a block 16 enables a unique attachment with a leash, rope or chain (not shown) to the stake 12, a cylindrical rotatable sleeve 18 to control the height at which the leash is attached to the stake 12, and an optional cap or housing 20 (see FIG. 3) to protect the tethered animal from the stake 12.

The apparatus 10 is designed to allow the attached leash to freely rotate around the stake 12 so as to prevent the leash from becoming entangled on the stake 12. Furthermore, the pet owner has the option of fixing the leash so as not to permit any rotation of the leash by placement below the sleeve 16 as will be explained below. The stake 12 is used to anchor the pet tether apparatus 10 at a fixed location. The use of a stake 12 to anchor the apparatus 10 provides portability, so that the apparatus 10 can be transported and installed in a park, field or backyard.

The stake 12 is constructed of durable material such as hardwood, steel, aluminum, plastic, or combinations thereof which can be driven into the ground by a hammer or mallet. The upper or top end 22 of the stake 12 is flat, so that a hammer or mallet may be applied to the flat surface to drive the stake 12 into the ground. The bottom end 24 of the stake 12 comes to a point 26, so that the stake may be easily driven into the ground.

Figure 2:
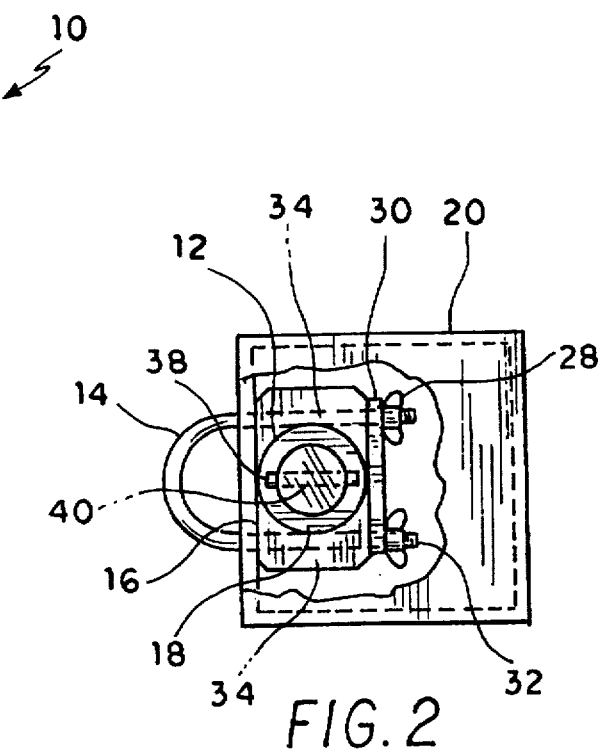
FIG. 2 is a top view of the pet tether anchor.
Figure 3:
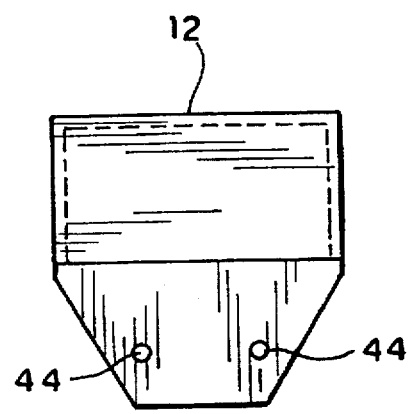
FIG. 3 is a rear view of the protective cap for the pet tether anchor.
Figure 4:
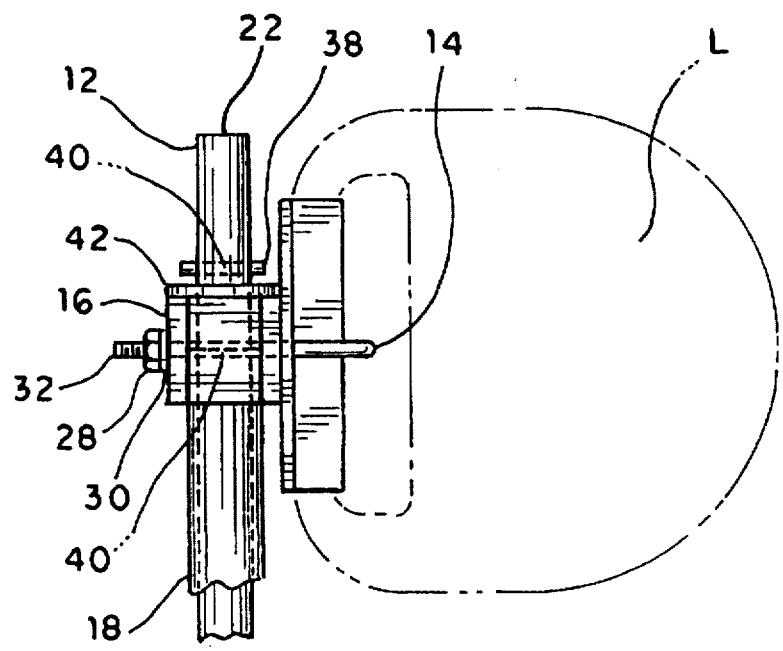
FIG. 4 is a side view of the pet tethering anchor in use with a retractable animal leash device outline shown in a dashed line.
Figure 5:
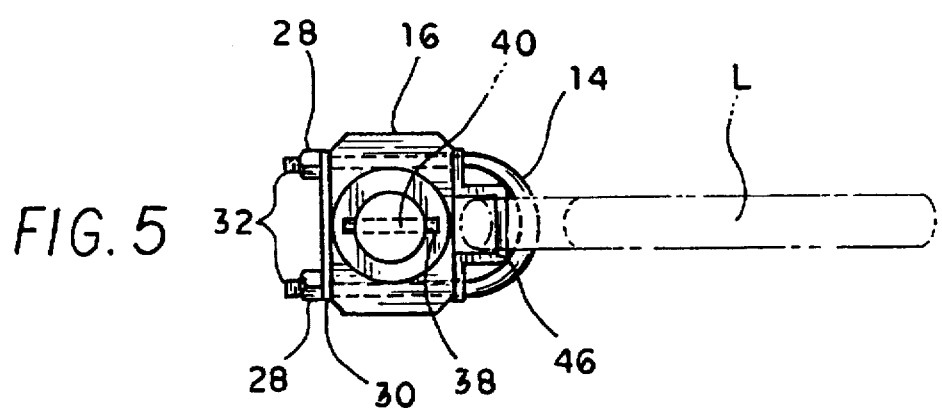
FIG. 5 is a top view of the pet tethering anchor in use with a retractable animal leash.

The leash is attached to the stake 12 by means essentially of the U-bolt 14 and the block 16, as shown more clearly in FIGS. 2 and 5. The U-bolt 14 and block 16 allow the user to quickly and easily remove the U-bolt 14 from the block 16 by removing two wing nuts 28 and a two-holed washer plate 30 from the forked ends 32, slipping the U-bolt 14 into the leash or chain link, and resecuring the U-bolt 14 to the block 16 with the wing nuts 28 and the two-holed washer plate 30. Conventional hexagonal or square nuts can be substituted for the preferred wing nuts 28. The U-bolt configuration allows the owner to accommodate several different size ropes, chains, leashes, or a retractable leash device (FIGS. 4 and 5), rather than being constrained to a specific sized attachment hole.

The block 16 is preferably constructed from metal or a rigid plastic material. The block 16 has two horizontal throughbores 34 formed in the block to accept the two forks of the U-bolt 14 alongside a single vertical throughbore 36 to accept the stake 12.

The pet tether anchor 10 of the present invention is versatile in accommodating either (1) a rotating tethered attachment at an adjustable vertical level on the sleeve; (2) a rotating stake tethered attachment located above or below the sleeve; or (3) a non-rotating ground level tethered attachment located below the sleeve.

(1) The U-bolt 14 and block 16 can be positioned at various predetermined heights on the cylindrical rotating sleeve 16, and shown in Pig. 1 as being positioned at the upper end of the sleeve 16. As seen in FIG. 4, block 16 is fixed at one location on the cylindrical sleeve 18 and can be positioned at any location between two positions on the stake. These positions are defined by pins, e.g. straight pins 38 or cotter pins (not shown), or curvilinear clips inserted through the stake. Examples of curvilinear clips are C- or E-shaped clips (not shown) which conform to grooves (not shown) formed in the stake. As seen in Pig. 1, these positions take the exemplary form of two straight pins 38. The pins 38 extend through pinholes 40 in the stake 12. One pinhole is near the top of the stake, approximately one inch from the upper or top flat end 22, and the other is located near the center of the stake 12. The upper pin 38 prevents the block 16 and sleeve 18 from being pulled off by the tethered animal. Two sleeve holding washers 42 are placed between the pins 38 and the block 16 and/or sleeve 18 for additional stability and mobility of the sleeve 18 and the block 16. It is noted that no bearings are required to add to the cost of this apparatus.

(2) An alternative to a vertical throughbore 36 would be countersinking (an incomplete bore, not shown) to allow the sleeve 18 to be partially inserted into the block 16. This alternative would maintain the rotatable block and tether attachment at a fixed location either proximate to the top end 22 or proximate to the bottom of the sleeve 18 on the stake 12.

In the instance, wherein the block 16 is located proximate to the upper or top flat end 22 of the stake 12, an optional cap or housing 20 having five sides, an open bottom and with one end side extended would be appropriately attached to protect the leashed animal from possible injury. The cap or housing 20 with two appropriately located holes 44 in the edge portion of the extended side can facilitate the attachment of the cap or housing 20 by the U-bolt 14.

The pet tether anchor 10 can be used to secure an animal in a specific dirt ground location. When used in this capacity the securing U-bolt 14 and block 16 are placed above the sleeve 18 to keep dirt and small rocks from becoming wedged in between the block 16 and the stake 12. Moreover, the block 16 has the extra clearance or space left by the absence of the sleeve 18 at this point to rotate freely.

(3) The block 16 can also be positioned close to the ground by placing the block 16 below the sleeve 18, and driving the stake 12 into the ground up to the lower pin 38.

The pet tether anchor 10 can also be used in conjunction with animal chain stringers (not shown). These chain stringers are attached between two points onto which animals may be periodically attached. Stringers are usually placed on the ground so that they are less of a hazard to the animals attached to the stringer, as well as to people who accidentally walk over the stringer. Two pet tether anchors 10 can be used to secure the ends of a stringer. Then, multiple tethers can be attached to a stringer. In this situation the securing means, block 16 and U-bolt 14 are placed under the sleeve so that the stringer chain will be secured at ground level.

The pet tether can be adapted to be used with a retractable animal leash L as shown in FIGS. 4 and 5. A bracket 46 is inserted between the U-bolt 14 and the block 16 to provide additional support to the retractable leash L. When used in combination with a retractable leash L, the tethered animal would be free to wander around the stake 12, and the leash would feed in and out of the retractable animal leash L as the animal moves away from or towards the stake 12.

The versatile pet tether anchor 10 provides an improved apparatus for securing a pet or a plurality of pets to a specific location, and offering alternatives in height location and rotatability. The pet tether anchor 10 provides for quick and easy installation at any ground soil location. It is designed to secure animals of all sizes from cats and dogs to ponies and horses. The pet tether anchor 10 enables its use with any type of leash, rope or chain. The pet tether anchor 10 can be equipped with an optional protective cap or housing 20 when the block 16 is located proximate to the top end 22 to keep the animal from injuring itself on the apparatus. It is an improved apparatus and method that will be useful to all persons with any pet.

It is to be understood that the present invention is not limited to the embodiments described above, but encompasses any and all embodiments within the scope of the following claims.

I claim:
1. A portable pet tether anchor apparatus for anchoring at least one leash, said pet tether anchor comprising:
   an elongated cylindrical shaft having means for inserting the anchor in the ground;
   an elongated and rotatable sleeve positioned on an upper portion of said shaft; and
   a block assembly providing for attachment of at least one leash, said block assembly including
      a block having a generally vertical bore, said shaft passing through the vertical bore, said block further having two generally horizontal bores, and
      a U-bolt passing through said two horizontal bores and attached to said block by removable fasteners;
   whereby upon installing said shaft in a ground surface and attaching said block assembly to a leash restraining an animal, said block assembly is rotatable about said shaft to prevent entanglement of the leash around the pet tether anchor apparatus as the animal moves around the apparatus.

2. The pet tether anchor apparatus according to claim 1, wherein the sleeve is confined vertically on the shaft by upper and lower pins inserted through the shaft cooperating with upper and lower washers located at each end of the sleeve.

3. The pet tether anchor apparatus according to claim 2, wherein the block assembly is located below the upper pin and protected by a housing attached to the block assembly, whereby injury to a leashed animal by the pet tether anchor apparatus is minimized.

4. The pet tether anchor apparatus according to claim 3, wherein the housing has five sides, an open bottom and with one end side extended is attach to the block assembly.

5. The pet tether anchor apparatus according to claim 2, wherein the block assembly is located between the lower pin and the sleeve, whereby rotation of the block assembly can be permitted or avoided by predetermined spacing of the block assembly relative to the ground surface.

6. The pet tether anchor apparatus according to claim 1 further including a retractable leash device attached to said block assembly.

7. The pet tether anchor apparatus according to claim 6, wherein a bracket is positioned and held by the U-bolt to attach the retractable leash device to the block assembly.

8. The pet tether anchor apparatus according to claim 1, wherein said removable fasteners include wing nuts, whereby removal of the wing nuts facilitates the addition and removal of a leash.

9. The pet tether anchor apparatus according to claim 1 wherein said removable fasteners include hexagonal nuts, whereby removal of the hexagonal nuts facilitates the addition and removal of a leash.

* * * * *